United States Patent [19]

Butler

[11] 4,157,642
[45] Jun. 12, 1979

[54] CATCH FRAME FOR FRUIT PICKER

[75] Inventor: Donald L. Butler, Fort Myers, Fla.

[73] Assignee: American Citrus Machinery Inc., Labelle, Fla.

[21] Appl. No.: 722,406

[22] Filed: Sep. 13, 1976

[51] Int. Cl.² .............................................. A01D 46/00
[52] U.S. Cl. ......................................................... 56/329
[58] Field of Search ................................ 56/328 R, 329

[56] References Cited

U.S. PATENT DOCUMENTS

| | | | |
|---|---|---|---|
| 2,692,470 | 10/1954 | Boman | 56/328 TS |
| 3,218,790 | 11/1965 | Edgemond, Jr. | 56/329 |
| 3,417,559 | 12/1968 | Boman et al. | 56/329 |
| 3,553,949 | 1/1971 | Rauth | 56/329 |

*Primary Examiner*—Russell R. Kinsey
*Attorney, Agent, or Firm*—Alfred E. Wilson

[57] ABSTRACT

The device of the present invention comprises a fruit catch frame for pivotal attachment to a conveyor trailer which conveys fruit from the catch frame into a large receptacle to be deposited in the load carrying body of a truck. Fruit, particularly of the citrus variety such as oranges, is often automatically dislodged from orchard trees in large quantities. The catch frame is horizontally positioned under a fruit tree to catch the falling fruit and includes a central conveyor portion, an outer portion, hydraulically operable, between extended and retracted positions and a pair of pivotal, opposed side wing portions. The outer and side wing portions are operable to upwardly, outwardly angled positions to funnel fruit falling thereon onto the central conveyor portion for movement onto the conveyor trailer. The surfaces of the outer and side wing portions are cushioned to absorb the shock of the falling fruit to prevent injury thereto. From the horizontal operating positions, the catch frame is hydraulically movable to a generally vertical position with the side wing portions pivoted inwardly to an overlying relation with the central conveyor portion.

14 Claims, 8 Drawing Figures

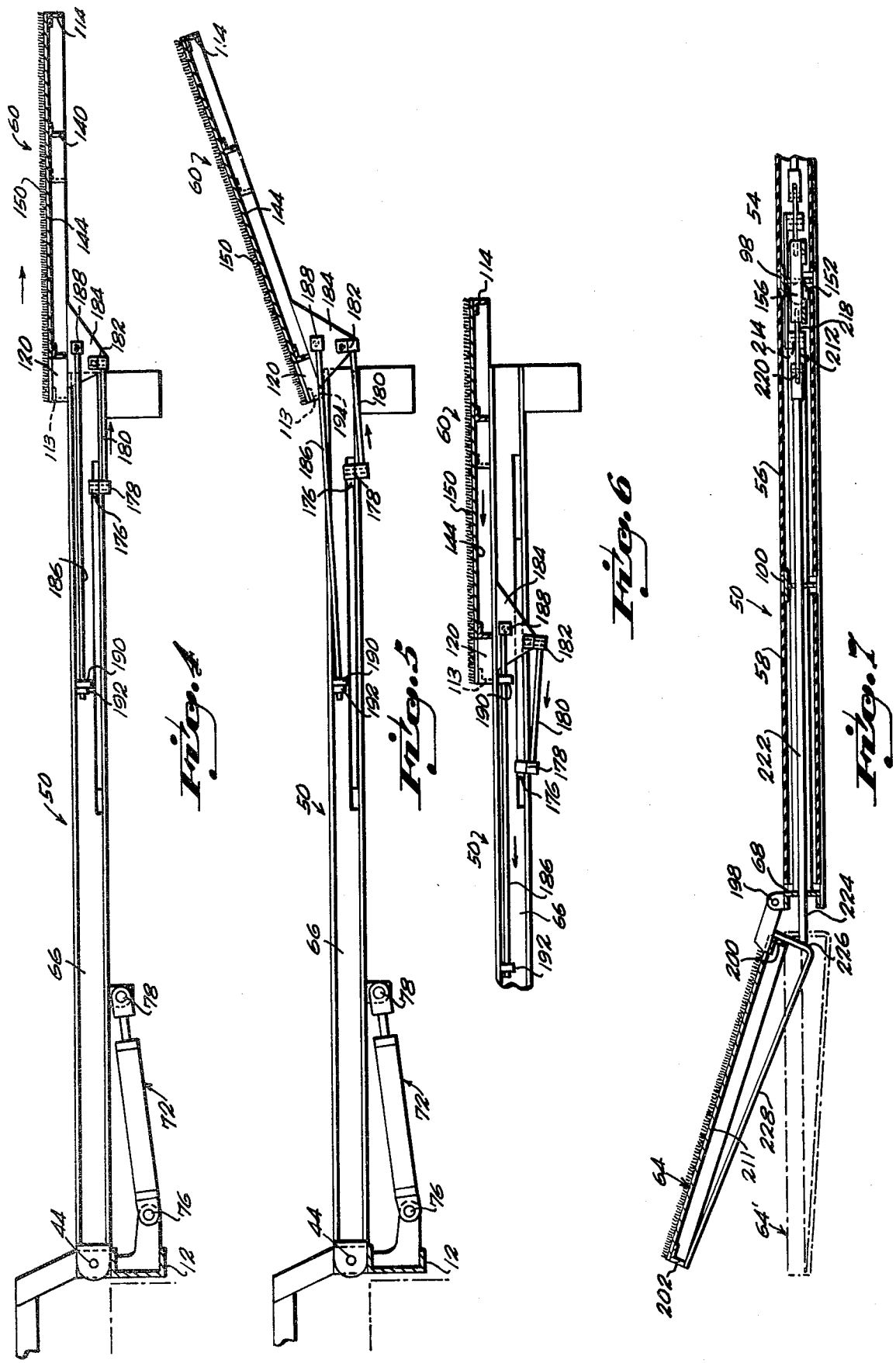

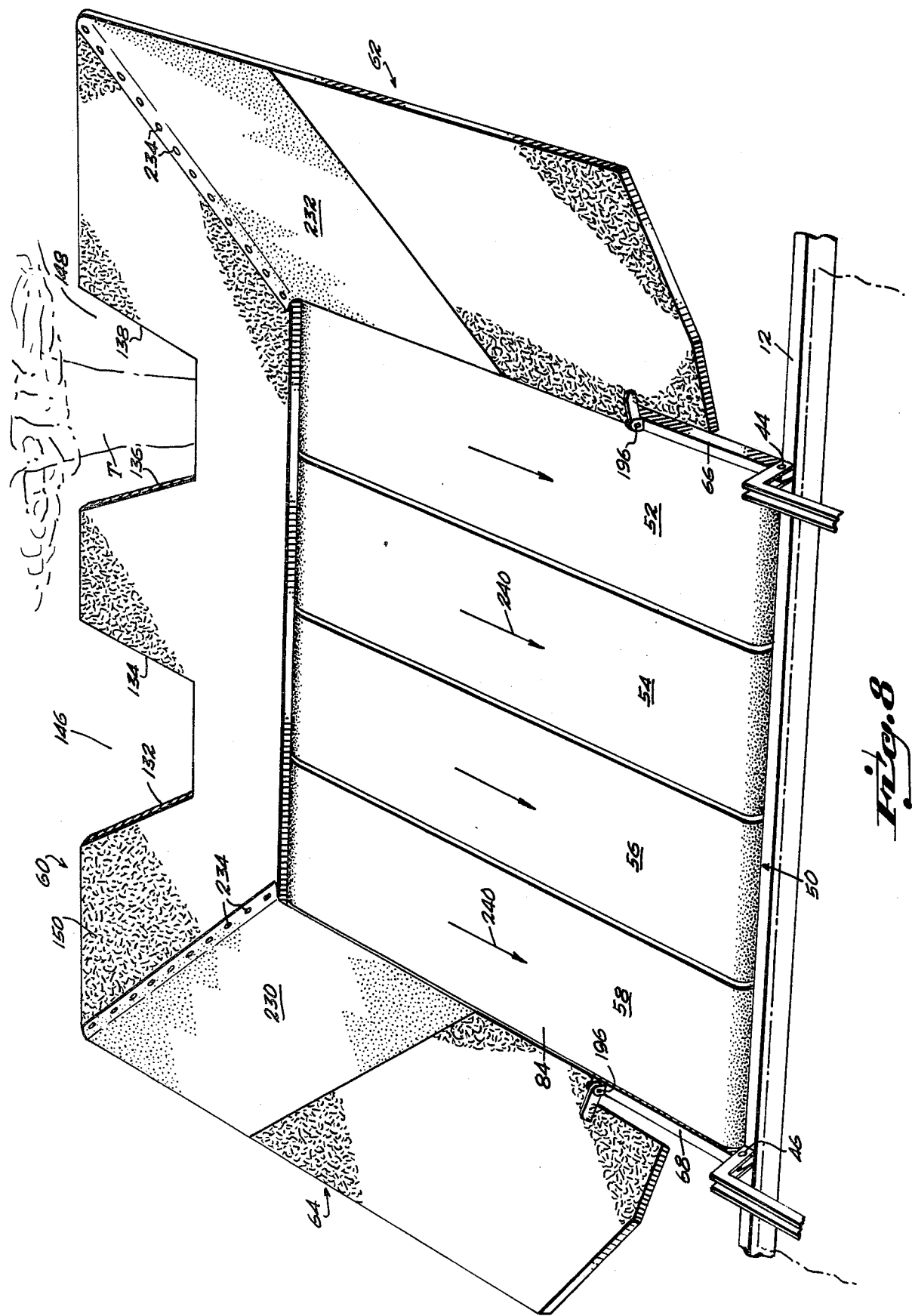

CATCH FRAME FOR FRUIT PICKER

BACKGROUND OF THE PRESENT INVENTION

The present invention pertains to a fruit catch frame and more particularly to a device of this nature which is adaptable for pivotal attachment to a mobile assembly used for harvesting fruit, particularly of the citrus varieties.

The mobile assembly is comprised of a tow vehicle provided with a hydraulically operated boom for moving and positioning a device for dislodging fruit from the trees, a conveyor trailer, hitched to the tow vehicle for conveying fruit, disposed thereon, into a receptacle carried by an assembly at the rear end of the trailer, and at least one and preferably two catch frame assemblies, pivotally attached to opposed side rails of the trailer. The catch frames are pivotally movable from vertically disposed inoperative positions to outwardly extending, generally horizontal, operating positions.

Each catch frame includes a central conveyor portion, a front extendable portion and a pair of opposed pivotal side extensions. In operation, the outer end and side portions are operable by a suitable fluid drive means such as hydraulic cylinder and piston assemblies to upwardly, outwardly angled positions when properly located beneath a fruit tree. When so arranged, some of the fruit dislodged from the tree, drops onto the central conveyor portion for movement onto the conveyor trailer. The portion of the fruit which drops onto the outer end and side wing portions is funneled onto the central conveyor portion for movement onto the conveyor trailer.

The outer end extendable portion includes one and preferably two, outwardly opening cut-outs whereby said portion may be extended to partially surround the base portion of a fruit tree trunk.

OBJECTS AND ADVANTAGES OF THE PRESENT INVENTION

One of the principal objects of the present invention is to provide a fruit catch frame that is pivotally attachable relative to one side rail of a conveyor trailer in a manner so that, when properly positioned relative to a fruit tree, it will catch the fruit dislodged from the tree and convey it onto the conveyor trailer for movement into a proper receptacle.

Another principal object of the instant invention is to provide a fruit catch frame which is movable from an outwardly extended generally horizontal position to a generally vertical position, within the confines of the conveyor trailer, for over-the-road movement by a tow vehicle, said tow vehicle being of a type which is provided with a boom for operating a device for dislodging the fruit from the trees.

Another object of the invention is to provide a fruit catch frame comprised of a central conveyor portion, an extendable, retractable front end portion and a pair of side wing portions, pivotally attached to opposed side rails of the central conveyor portion for movement from opposed, outwardly extended positions to opposed, inward positions in an overlying relation to side portions of said central conveyor portion.

A further object of this invention is to provide an appropriate fluid drive means to selectively extend and retract the front end portion and to simultaneously angle said front end portion and two side wing portions upwardly, outwardly at the termination of the forward extension of the front end portion.

A still further object of the invention is to provide a cushion material such as a synthetic turf in a fixed covering relation with the top surfaces of the front end and side wing portions.

Yet another object of the present invention is to provide at least one, and preferably two outwardly opening cut-outs in the front end portion whereby said portion may be extended to partially surround the base portion of a fruit tree trunk.

BRIEF DESCRIPTION OF THE DRAWINGS

FIG. 4 is a cross sectional view taken along line 4—4 of FIG. 2;

FIG. 5 is a cross sectional view similar to FIG. 4 with the outer end portion in an extended, outwardly, upwardly angled position;

FIG. 6 is a fragmentary cross sectional view similar to FIGS. 4 and 5 with the outer end portion in a retracted position;

FIG. 7 is a fragmentary cross sectional view taken on line 7—7 of FIG. 2; and

FIG. 8 is a perspective view of a fruit catch frame of the present invention in an in-use position relative to a fruit tree.

DETAILED DESCRIPTION OF THE DRAWINGS

Figure 1:
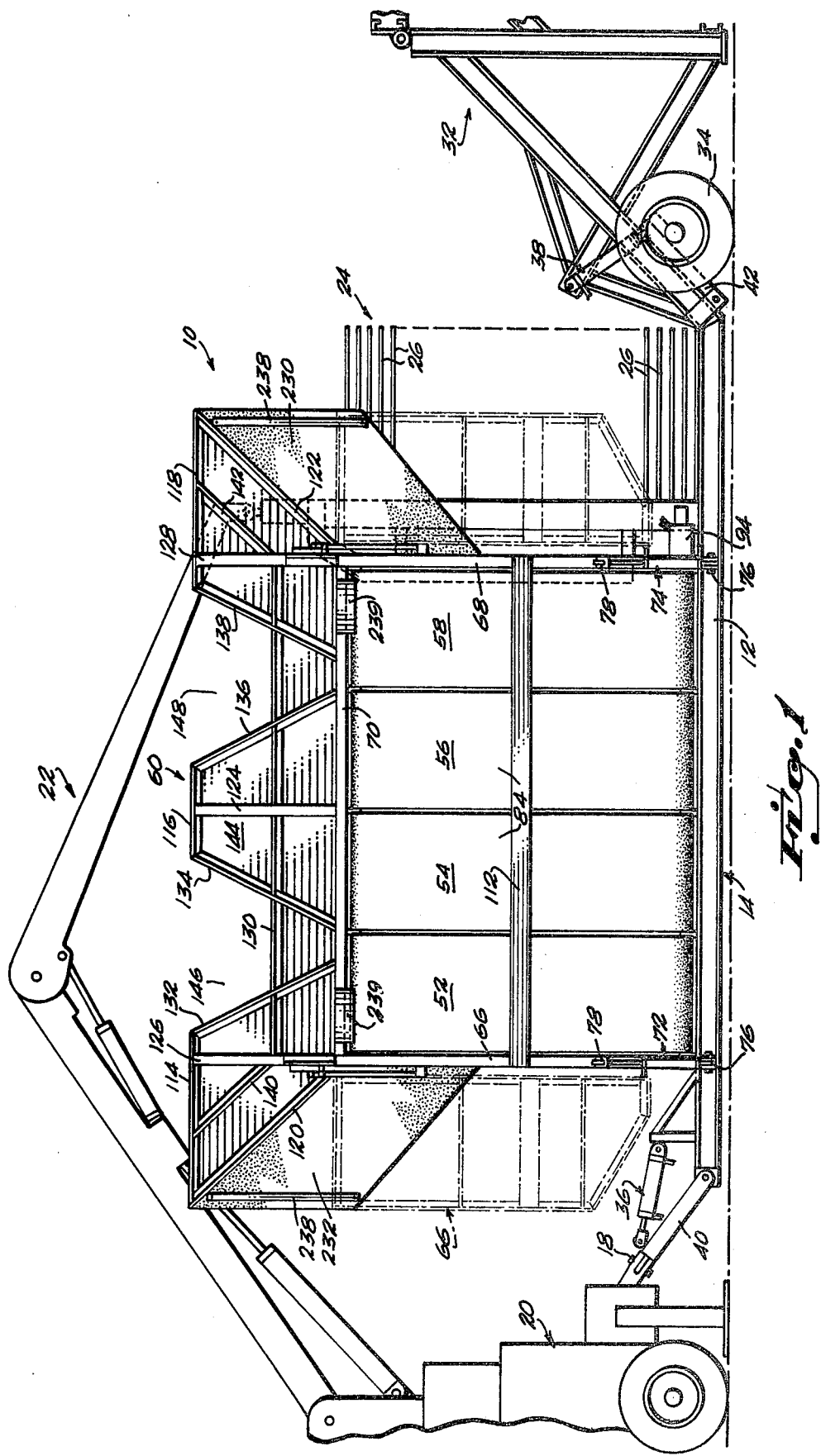
FIG. 1 is a side elevational view illustrating one catch frame of the present invention, pivotally attached to a side rail of a conveyor trailer, a boom carrying tow vehicle and a receptacle carrying assembly which is fragmentarily illustrated.
Figure 2:
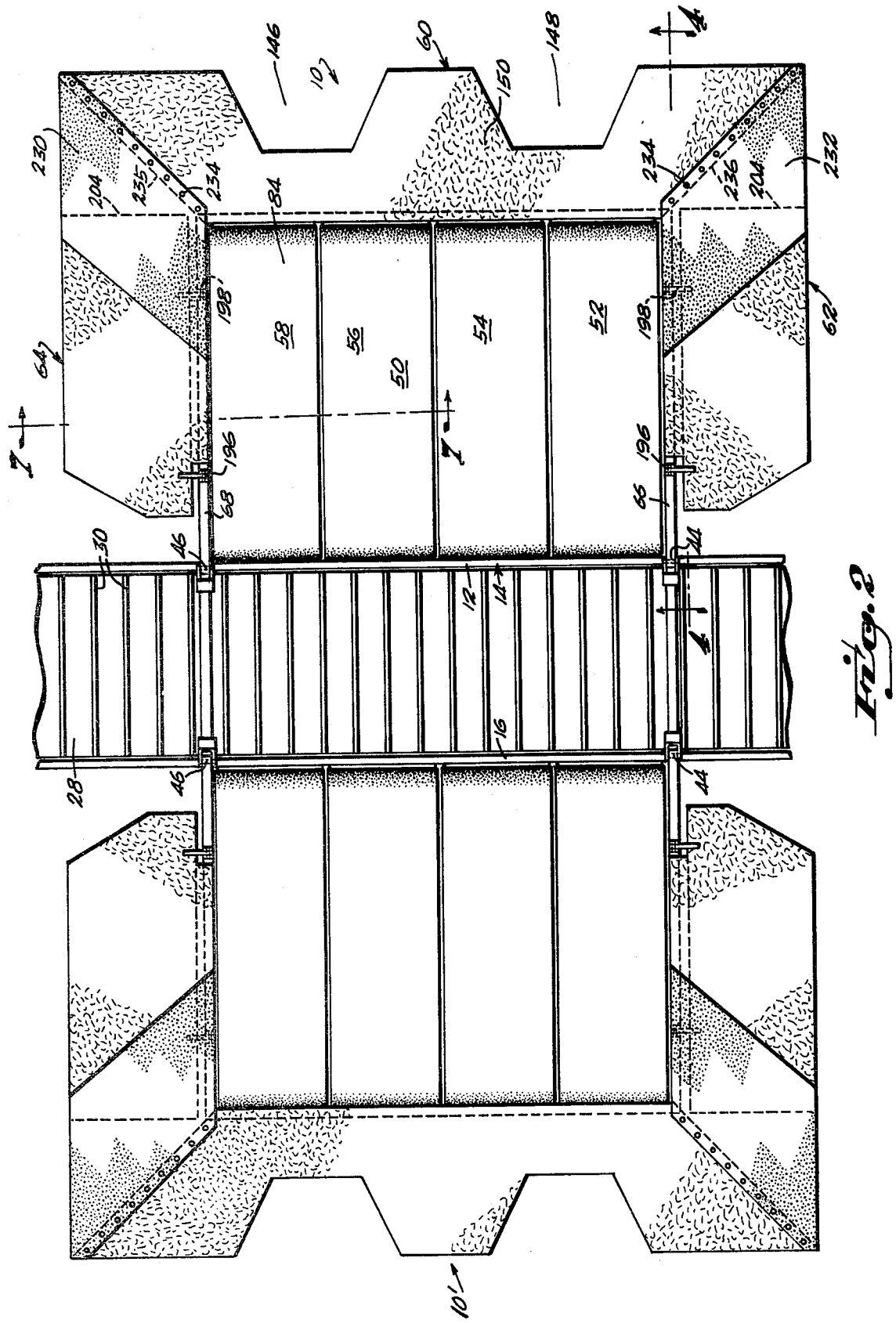
FIG. 2 is a top plan view of the conveyor trailer with a pair of catch frames of the present invention, pivotally attached to the respective side rails thereof in generally extended, horizontal, operating positions.

With reference to the drawings in which like reference characters designate like or corresponding parts throughout the various views and with particular reference to FIG. 1, a fruit catch frame of the present invention is indicated generally at 10 in a generally vertical position, pivotally connected to one side rail 12 of a conveyor trailer 14, the opposed side rail being indicated at 16 in FIG. 2. The conveyor trailer 14 is illustrated hitched at 18 to tow vehicle 20, said tow vehicle 20 being equipped with a conventional, universally operable boom 22 for carrying and manuvering a device 24, forming no part of the present invention, for vibrating the limbs and twigs of a tree such as an orange tree to dislodge the fruit therefrom, causing it to fall free onto the fruit catch frame when it is properly positioned relative to the tree. The device 24 is provided with a multiplicity of generally horizontally outwardly extending rods 26 which are moved by boom 22 into a penetrating position relative to the limbs, twigs and foliage of a fruit tree and vibrated to dislodge the fruit. FIG. 1 illustrates the device 24 in a stowed position on the trailer for transportation purposes.

As illustrated in FIG. 2, the trailer 14 is provided with a longitudinally extending conveyor 28 of a conventional type, being provided with a plurality of relatively closely spaced, upstanding, transverse flights 30 to engage and move fruit thereon rearwardly to a structure, fragmentarily illustrated at 32. This structure 32 comprises means for carrying and positioning receptacles to be filled by fruit from the conveyor 28 and forms no part of the present invention. A pair of rear wheels 34 are provided for the conveyor trailer 14.

In the position illustrated in FIG. 1, the main body portion of trailer 14, comprised of side rails 12 and 16, conveyor 28 and cross braces (not shown), is in a lowered position for the fruit harvesting operations. The trailer 14 may be moved from tree-to-tree between two rows thereof in this lowered position when the terrain permits. For over-the-road operation and for operation over unfavorable terrain, forward and rearward hydraulic cylinder and piston assemblies 36 and 38 may be actuated to raise the trailer 14 to a substantially higher elevation for clearance purposes by means of the forward and rearward linkages 40 and 42.

With reference to the fruit catch frame of the present invention, a pair of said catch frames 10 and 10' are pivotally attached as at 44 and 46 to the respective side rails 12 and 16. As both catch frames 10 and 10' are identical in all respects, the detailed description thereof will be in the singular.

Each catch frame such as 10 includes a central conveyor portion 50 comprised of four conveyors 52, 54, 56 and 58 in the form illustrated, an extendable, retractable, tiltable outer end portion 60 and a pair of pivotal side wing portions 62 and 64.

Figure 3:
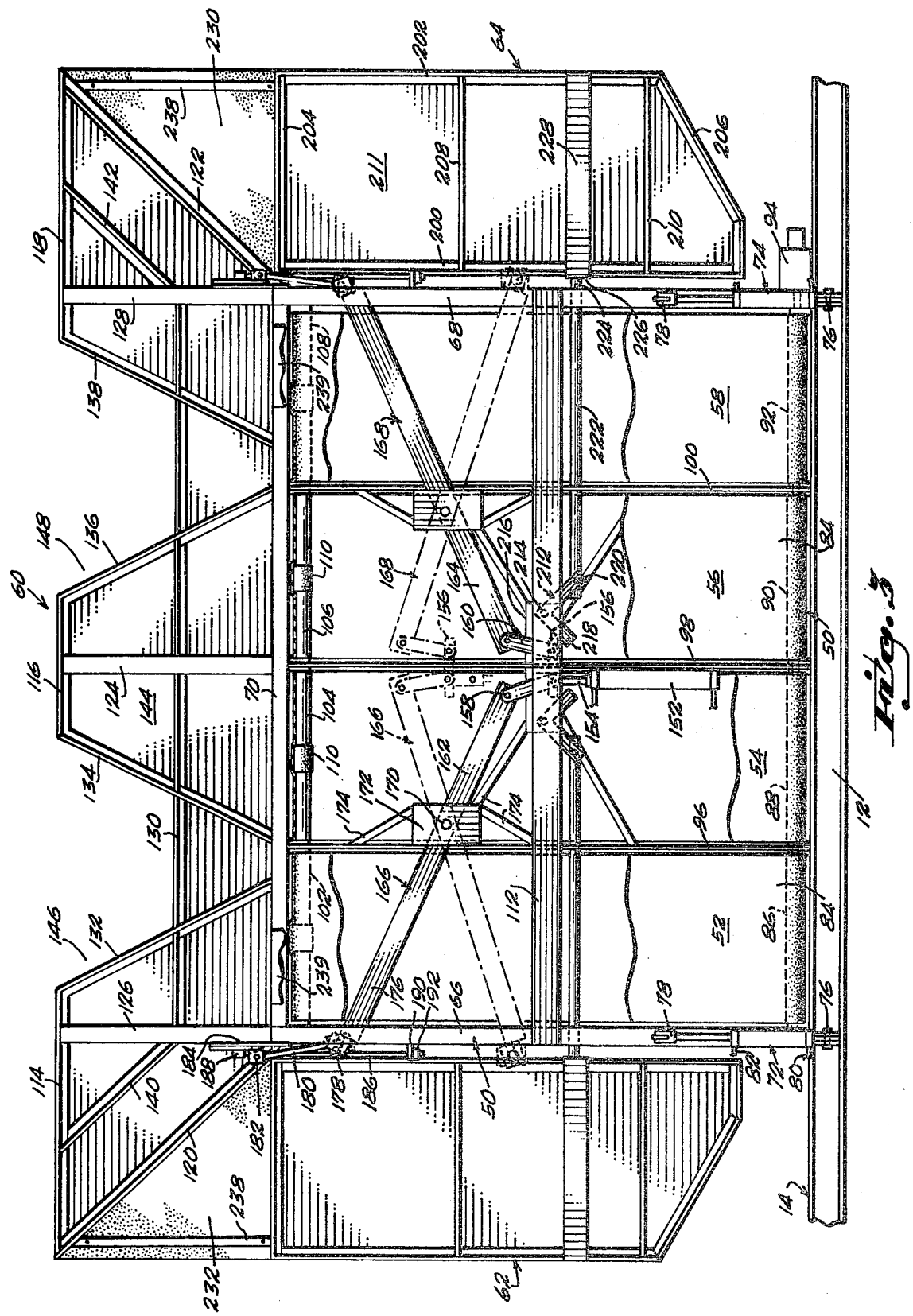
FIG. 3 is a bottom plan view of a catch frame with parts broken away to better illustrate the operating elements thereof.

With particular reference to FIG. 3, the catch frame conveyor portion 50 includes a frame comprised of opposed side rails 66 and 68 interconnected at their extended ends by a rail 70. The inner ends of side rails 66 and 68 include the pivotal connections 44 and 46 to side trailer rail 12 and a pair of fluid operated actuating means such as the hydraulic cylinder and piston assemblies 72 and 74 are pivotally connected at 76 and 78 between the trailer side rail 12 and the respective side frame rails 66 and 68. Cylinder and piston assemblies 72 and 74 are of a conventional double acting type by means of conduits 80 and 82 to selectively raise and lower the entire catch frame 10 between the raised, generally vertical attitude of FIGS. 1 and 3 and the lowered, generally horizontal attitude of FIGS. 2 and 8.

The four conveyors 52 through 58 include continuous belts such as 84 drivingly engaged at their inner ends around interconnected drive drums 86, 88, 90 and 92. Drive means such as a hydraulic motor 94 powers the drive rollers 86 through 92 which are journalled in the opposed side rails 66 and 68 and intermediate rails 96, 98 and 100 extending longitudinally between each adjacent pair of conveyor belts 84.

Idler drums 102, 104, 106 and 108 for conveyor belts 84 are journalled between side rails 66 and 68, and the intermediate rails 96, 98 and 100 adjacent the outer end of the central conveyor portion 50. Each idler roller 102 through 108 is provided with a central circumferential enlargement 110 which maintains the conveyor belts 84 on a true travel course, preventing and tendency to a sidewise traveling movement. A transverse bottom brace member 112 is fixed as by welding across side rails 66 and 68, and intermediate rails 96, 98, 100.

With reference to the portion 60, it includes a frame comprised of a transverse back rail 113, FIGS. 4, 5 and 6 three transverse outer rail segments 114, 116 and 118, outwardly diverging, opposed end rails 120 and 122, a center rail 124, connecting between the back rail 113 and outer rail segment 116, and a pair of intermediate rails 126 and 128 in general alignment with the side rails 66 and 68 of the conveyor portion 50. A transverse, intermediate rail 130 connects between rails 124, 126 and 128. Two pairs of inwardly converging rails 132, 134 and 136 are fixed between the outer rail segments 114, 116 and 118 and back rail 113 on opposed sides of center rail 124. Auxiliary, angulated brace rails 140 and 142 connect respectively between outer rail segments 114, 118 and intermediate rails 126, 128. A top cover plate 144, fixed to the above described front frame assembly, is provided with two cut-outs 146 and 148, defined by the outer portions of the invwardly converging rails 132, 134 and 136, 138 for a purpose to be hereinafter described. A cushioning top surface 150 such as a synthetic turf material is applied in any conventional manner atop the coverplate 144.

With particular reference to FIG. 3, a fluid operation actuating means such as the double acting hydraulic cylinder and piston assembly 152, 143 is fixed relative to the center rail 98 of the conveyor portion 50. An elongated, transverse head 156 is fixed to the extended end of the piston rod 154 and a pair of links 158, 160 are pivotally connected between the opposed end portions of head 156 and the inner ends of 162, 164 of a pair of lever arms 166, 168.

Both levers 166, 168 function in the same manner to opposite sides of front portion 60 and will be described relative to lever 166. Lever 166 is pivoted at 170, intermediate its length, to a plate 172 fixed to the intermediate rail 96 of the conveyor frame. A plurality of auxiliary brace members such a 174 connect to the plate 172 from said frame. An outer end 176 of lever 166 is pivotally connected at 178 to one end of a connector rod 180, FIGS. 3 though 6. Connector rod 180 is pivotally connected at its outer end 182 to a bracket 184, fixed to and extending downwardly from the outer extension portion 60.

With particular reference to FIGS. 4, 5 and 6, a second rod 186 is pivotally connected at 188 to the bracket 184, above and somewhat outwardly of the pivotal connection 182 of rod 180. Rod 186 extends rearwardly from connection 188 for sliding engagement through a journal lug 190, fixed to and extending outwardly of the side rail 66. Rearwardly of lug 190, a stop or limit means such as collar 192 is fixed to the inner end portion of rod 186.

In operation, and referring to FIGS. 3 and 6, when the hydraulic cylinder and piston assembly 152, 154 is actuated to pivot the lever 166 to the broken line position 166' the connector rod 180 is moved to the position illustrated in FIG. 6. As further illustrated in FIG. 6, the outer extension 60 is thereby retracted to a position substantially overlying the outer end of the conveyor portion 50. Actuation of the cylinder and piston assembly 152, 154 to the full line illustration in FIG. 3 will initially move the outer extension 60 to the extended position of FIG. 4 during the major portion of the stroke of piston rod 154. The second rod 186 slides through the journal lug 190 until the collar 192 abuts the lug 190, thereby preventing any further forward movement of the outer extension portion 60. The final inward movement of piston rod 154 continues the outward movement of connector rod 180 and causes the portion 60 to pivot upwardly along its bottom rear edge 194 to the upwardly, forwardly angled position illustrated in FIG. 5.

Each of the side wing portions is hinged at 196, 198 to a side rail 66 or 68 of conveyor portion 50 and includes a frame comprised of inner and outer, parallel side rails 200, 202, end rails 204, 206 connecting between the respective side rail ends and a pair of intermediate, transverse cross braces 208, 210. Both wing portions are provided with a top cover plate 211 with a covering of a resilient material such as a synthetic turf and are operated and function in a like manner, to be hereinafter described relative to wing portion 64 as illustrated in FIGS. 3 and 7.

A bell crank lever 212 is pivotally attached at 214 to a plate 216, attached to the frame of the conveyor portion 50 in a manner similar to pivot plate 172. Simultaneous to the upward, outer angulation of the outer extension portion 60, the final inward movement of piston rod 154, causes the transverse piston rod head 156 to contact one arm 218 of the bell crank lever 212 to cause pivotal movement thereof about pivot 214. The second arm 220 of bell crank 212 is pivotally connected to a slide rod 222, slidably journalled through holes in the side rail 68 and intermediate rail 100. An outward extension 224 of slide rod 222 is positioned to contact an abutment portion 226 of an angular transverse plate, 228 fixed as by welding across parallel side rails 200 and 202 of side wing 64 to angle it outwardly and upwardly from the broken line position 64' in FIG. 7 to the solid line position 64. When the operation of the piston rod 154 is reversed the side wings 62 and 64, and the outer extension 60 are simultaneously lowered to generally horizontal positions and said extension 60 is retracted to the position of FIG. 6.

Flexible corner filler sheets 230 and 232 are fixed by an appropriate means such as screws or rivets 234 to the angulated side edges 235, 236 of the outer portion 60 and extend inwardly beyond the transverse positions of end rails 204 of the respective side wing portions 62 and 64 to an overlying position atop the outer end portions thereof. As shown in FIGS. 1 and 3, a semi-flexible strip 238 is fixed in any convenient manner inwardly of the outer edge of the underside of each sheet 230 and 232 for support purposes. A pair of support feet 239 are fixed to the underside of the front rail 70 to position the catch frame 10 in its horizontal attitude.

In operation, the conveyor trailer 14 is lowered to the position illustrated in FIG. 1 for example, between two rows of fruit trees. The two catch frames 10 and 10' are lowered by the hydraulic cylinder and piston assemblies 72 and 74 to the generally horizontal positions of FIG. 2 with the outer portions 60 retracted as in FIG. 6. The tow vehicle 20 is then operated to move the conveyor trailer 14 into a position wherein the base portion of the trunk of at least one fruit tree from one or both of the tree rows is in alignment with a cut-out 146 or 148 of at least one catch frame 10 or 10'. The outer portion 60 is then extended and angulated in the manner previously described to partially surround the tree trunk as illustrated relative to a tree T in FIG. 8. The four conveyor belts 52, 54, 56 and 58 are then operated by hydraulic motor 94 in the direction of arrows 240 and the fruit dislodging device 24 is operated in the manner previously described to dislodge the fruit from the tree, causing it to fall onto the catch frame. The impact of the fruit is broken by the cushioning effect of the conveyor belts, the synthetic turf covering of the front extension 60 and side wings 62 and 64 as well as by the flexible corner sheets 230 and 232.

The angulated positions of the extension 60 and the side wings 62 and 64, as seen in FIG. 8, effectively funnel all fruit falling on those portions onto the conveyor belts 52 through 58 for movement onto the longitudinally extending conveyor 28 for movement into a receptacle (not shown).

After the fruit dislodging operation is completed on the tree or trees within a cut-out 146, 148, the extended outer portion or portions 60 are retracted and the catch frames 10 and 10' are moved onwardly by the tow vehicle 20 to progressively repeat the operation along the length of the rows of trees.

I claim:
1. A fruit catch frame for pivotal connection to a conveyor trailer for movement between a generally vertical position and a generally horizontal position for positioning relative to a tree of a citrus fruit variety, for example, to catch fruit dislodged from the tree and to move said fruit onto a conveyor carried by the trailer for movement into a receptacle, said catch frame comprising
  a central conveyor portion including a peripheral frame, conveyor means to move fruit disposed thereon in the horizontal position onto the trailer conveyor, and a hinge connection from said frame to a side rail of the trailer,
  an outer portion including a frame and a top coverplate over said frame,
  a pair of side wing portions, each including a frame, a top coverplate over said frame, and a hinge connection to one side rail of a pair of opposed side rails of said peripheral frame for pivotal movement relative thereto between an outwardly extended position and an inwardly folded position,
  a first drive means to selectively move the fruit catch frame between the generally vertical and horizontal positions,
  a second drive means cooperating with the first drive means to power said conveyor means,
  a third drive means cooperating with the first and second drive means to move said front portion between a retracted position in a generally overlying relation to an outer upper segment of said conveyor portion, a second, forwardly extended position relative to said conveyor portion and, a third, upwardly angled extended position relative to said conveyor portion, and
  inter-operational means relative to said third drive means to angle both of said side wing portions upwardly from said outwardly extended positions with the fruit catch frame in the generally horizontal position.

2. The fruit catch frame as defined in claim 1 wherein the top plate surfaces of said outer and pair of side wing portions are covered with a cushioning material such as a synthetic turf to absorb the shock of impact of the falling fruit.

3. The fruit catch frame as defined in claim 2 wherein said front portion frame includes a pair of opposed, forwardly, outwardly angled side rails.

4. The fruit catch frame as defined in claim 3 including a flexible cover sheet, fixed along each of said angled side rails and extending rearwardly in a covering relation to a gap between said side rail and an outer end of one of said side wing portions, said sheet extending rearwardly from said gap over a top outer end portion of said one side wing portion.

5. The fruit catch frame as defined in claim 1 including at least one cut-out portion in said outer portion, extending from its outer end, partially through the width thereof.

6. The fruit catch frame as defined in claim 1 including two spaced apart cut-out portions in said outer portion, both of which extend from its front end, partially through the width thereof.

7. The fruit catch frame as defined in claim 1 wherein said first drive means comprises a pair of double acting hydraulic cylinder, piston and piston rod assemblies pivotally, operably connected between said trailer side rail and a pair of side rails of said peripheral frame.

8. The fruit catch frame as defined in claim 1 wherein said conveyor means comprises a plurality of uniacting, side-by-side conveyors, each comprising a conveyor belt, a drive drum and an idler drum, said drive drums being interconnected for a common driving connection to said second drive means.

9. The fruit catch frame as defined in claim 8 wherein said second drive means comprises a hydraulic motor.

10. The fruit catch frame as defined in claim 1 wherein said third drive means includes a double acting hydraulic cylinder, piston and piston rod assembly, a pivotally mounted lever, connector rod and slide rod means operably connected in driving engagement with said outer portion.

11. The fruit catch frame as defined in claim 10 wherein said lever, connector rod and slide rod means includes a pair of oppositely extending lever arms, each of which is pivotally connected intermediate first and second end portions to a frame portion, fixed relative to said peripheral frame; each of said first lever end portions being pivotally connected to an end portion of an elongated head, fixed relative to an extended end portion of said piston rod, and each of said second end portions being pivotally connected to a rearwardly extending end portion of a connector rod, comprising said connector rod means; the outwardly extending end portion of each of said connector rods being pivotally connected to a bracket, fixed relative to the underside of a side end portion of said outer portion frame to move said front portion between said retracted and forwardly extended positions upon proper operation of said hydraulic cylinder, piston and piston rod assembly.

12. The fruit catch frame as defined in claim 11 wherein said lever, connector rod and slide rod means includes a pair of slide rods, each of which is pivotally connected at end to one of said brackets in a spaced above relation to said connector rod pivotal connection thereto, the rearwardly extending portion of each of said slide rods being slidably engaged through a lug fixed relative to a side rail of said peripheral frame, an abutment means such as a collar being fixed to said slide rod rearwardly of said lug in a position to engage said lug and to arrest the forward movement thereof just prior to the termination of the forward movement of said connector rod, causing the final forward movement of the connector rod to angle said front portion in an upward direction.

13. The fruit catch frame as defined in claim 12 wherein said interoperational means comprises a pair of bell crank levers, pivotally connected to a frame member, interconnected with said peripheral frame; and a pair of oppositely extending, transversely journalled slide rods having first end portions extending outwardly of a pair of opposed side rails of said peripheral frame, a first arm of each of said bell crank levers being positioned for contact by said elongated piston rod head for pivotal movement during the final portion of an inward stroke of said piston rod causing a second arm of said bell crank lever, pivotally connected to the second end of one of said transversely journalled slide rods, to move said slide rod outwardly to contact an abutment plate fixed relative to one of said side wing portions to angle said side wing portion to an outward, upward position.

14. The fruit catch frame as defined in claim 1 including a pair of said catch frames, pivotally hinged in an opposed relation, respectively, to two spaced apart side rails of the conveyor trailer.

* * * * *